United States Patent
Natarajan et al.

(10) Patent No.: US 7,590,699 B2
(45) Date of Patent: Sep. 15, 2009

(54) INSTANT MESSAGING WITH BUILT-IN SEARCH

(75) Inventors: Aarthi Natarajan, Bellevue, WA (US); Brady D Forrest, Redmond, WA (US); Max Slade, Redmond, WA (US); Nicole D Tiesu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 478 days.

(21) Appl. No.: 11/159,650

(22) Filed: Jun. 23, 2005

(65) Prior Publication Data
US 2006/0294189 A1  Dec. 28, 2006

(51) Int. Cl.
*G06F 15/16* (2006.01)

(52) U.S. Cl. .................................... 709/206; 707/3
(58) Field of Classification Search ................. 709/206; 707/3
See application file for complete search history.

(56) References Cited

U.S. PATENT DOCUMENTS

| 6,539,421 | B1 | 3/2003 | Appelman et al. |
| 7,007,008 | B2 | 2/2006 | Goel et al. |
| 7,120,672 | B1 | 10/2006 | Szeto et al. |
| 7,188,143 | B2 | 3/2007 | Szeto |
| 2005/0234883 | A1* | 10/2005 | Szeto et al. ................ 707/3 |
| 2006/0059236 | A1* | 3/2006 | Sheppard et al. ............ 709/206 |
| 2006/0190546 | A1* | 8/2006 | Daniell ................... 709/206 |
| 2007/0271340 | A1* | 11/2007 | Goodman et al. .......... 709/206 |

OTHER PUBLICATIONS

PCT Search Report for PCT Application No. PCT/US06/18627, mailed Sep. 13, 2007 (6 pages).

* cited by examiner

*Primary Examiner*—Hassan Phillips
*Assistant Examiner*—Saket K Daftuar
(74) *Attorney, Agent, or Firm*—Lee & Hayes, PLLC

(57) ABSTRACT

Instant messaging with search is described. One or more techniques of the described techniques may be employed to provide a search during an instant messaging session, the results of which may then be shared between participants in the instant messaging session.

13 Claims, 10 Drawing Sheets

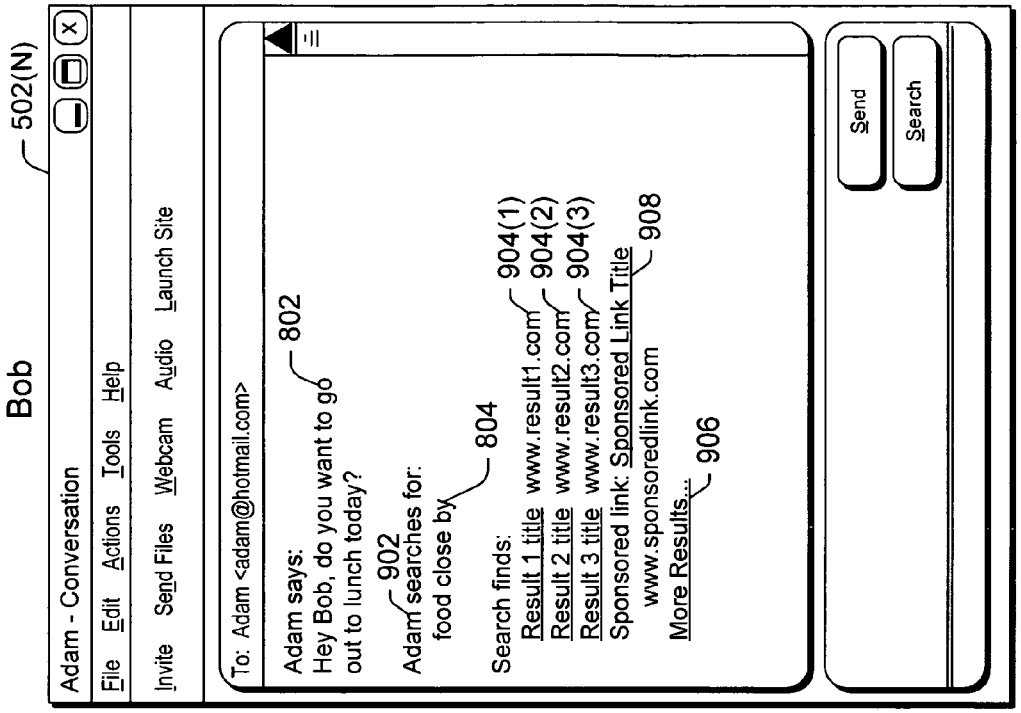
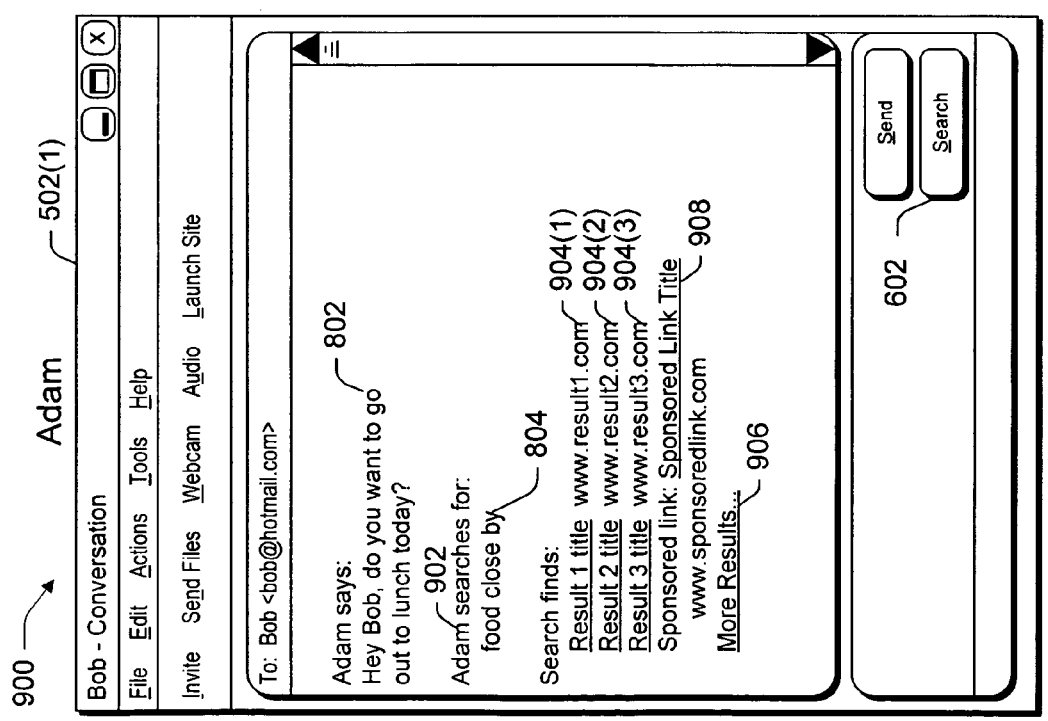
Fig. 9

INSTANT MESSAGING WITH BUILT-IN SEARCH

TECHNICAL FIELD

The present invention generally relates to searches and more particularly relates to instant messaging with search.

BACKGROUND

Instant messaging is a popular communication tool that enables two or more users to exchange messages via a network during an instant messaging session. When two users are online at the same time, for instance, instant messages may be exchanged in real time between the two users. Thus, the instant messages may be utilized to support a text conversation between the two users in a manner that mimics how the two users would participate in a typical spoken conversation.

Additionally, users have access to wide variety of content, such as web pages, songs, images, and so on. To locate particular content, the users may interact with a search engine which may provide one or more search results. However, searches for content are typically restricted to a single user such that the search and the results of the search are provided separately from the instant messaging session. For example, the user may interact with a search engine over a network and obtain results of the search. However, these search results are typically provided to the requesting user and are not available through the instant messaging session. Therefore, the user is generally unable to share the search results without manually entering the results into an instant message for communication to the other users, which is time intensive and inconvenient.

SUMMARY

Instant messaging with search is described. One or more techniques may be employed to provide a search during an instant messaging session, the results of which may then be shared between participants in the instant messaging session.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 9 is an illustration in an exemplary implementation showing the user interfaces of FIG. 5 as outputting search results and a search query utilized to obtain the search results as being shared by participants in an instant messaging session from the procedure of FIG. 4.

The same reference numbers are utilized in instances in the discussion to reference like structures and components.

DETAILED DESCRIPTION

Overview

Instant messaging with search is described. Traditional instant messaging and search are provided separately, thereby making it difficult for a user to share a search result. Accordingly, techniques are described in which instant messaging may incorporate search to provide results that may be shared between the users during an instant messaging session.

Two users, for instance, may communicate during an instant messaging session through the use of instant messages. During the session, one of the users may enter a search query into the instant messaging user interface which is utilized to perform a search using an online search provider, e.g., an online search engine provided via a particular website. A result of the search may then be provided for output by each of the clients participating in the instant messaging session, thereby "sharing" the search result. When output, the search result may also include an indication of who provided the search query (e.g., the user name in the instant messaging session of the initiating user), an indication of the search query that produced the search result, and so on. Thus, each of the participants in the instant messaging session may be readily informed as to a search performed by one or more of the participants.

In the following discussion, an exemplary environment is first described which is operable to employ techniques to provide instant messaging and search. Exemplary procedures and user interfaces are then described which may be provided by the exemplary environment, as well as in other environments.

Exemplary Environment

Figure 1:
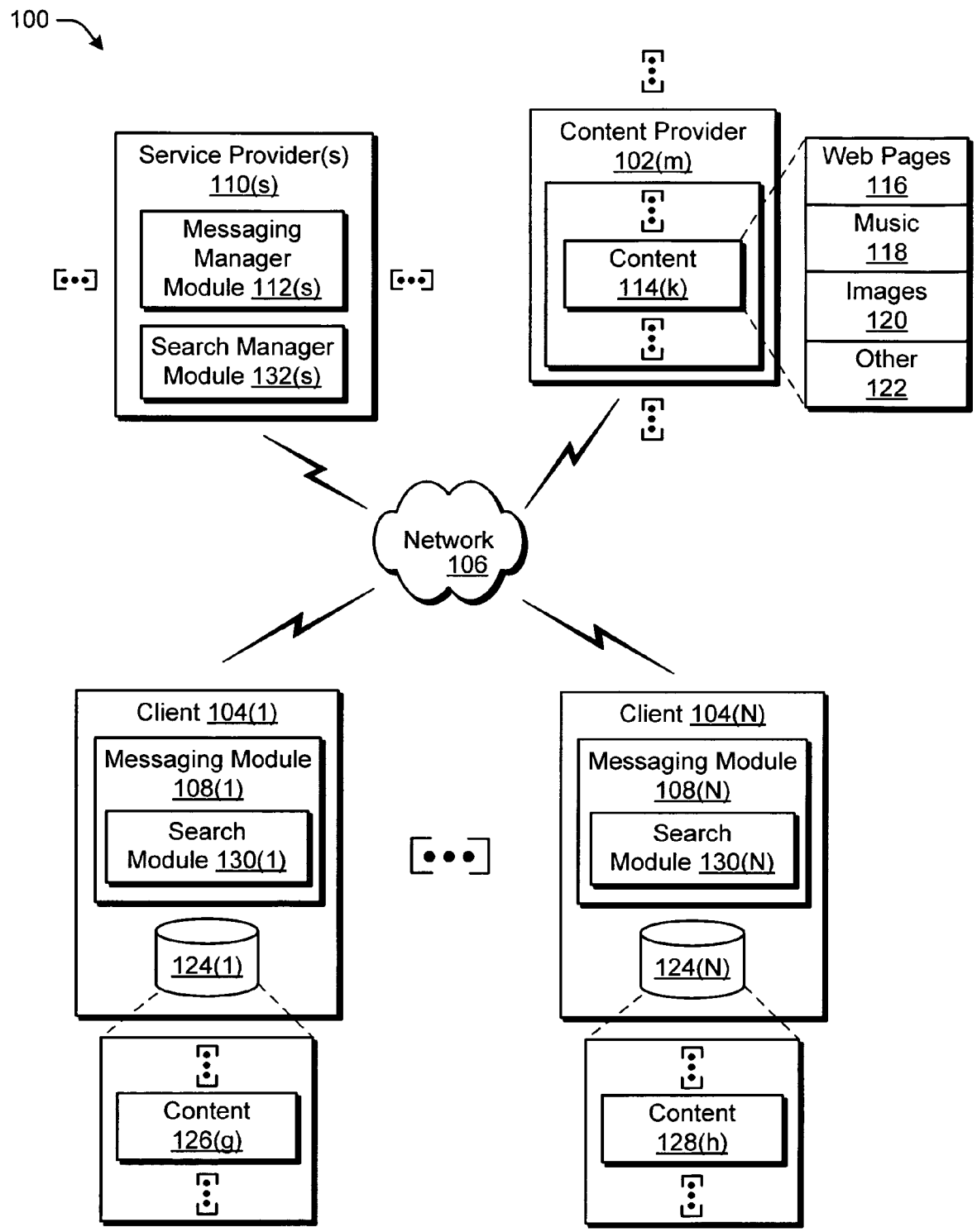
FIG. 1 is an illustration of an environment in an exemplary implementation which is operable to implement instant messaging with search.

FIG. 1 is an illustration of an environment 100 in an exemplary implementation which is operable to implement instant messaging with search. The environment 100 includes a plurality of content providers 102(m) (where "m" can be any integer from one to "M") which are accessible by a plurality of clients 104(1), . . . , 104(N) over a network. The clients 104(1)-104(N) may be configured in a variety of ways for accessing the network 106. For example, one or more of the clients 104(1)-104(N) may be configured as a computing device, such as a desktop computer, a mobile station, an entertainment appliance, a set-top box communicatively coupled to a display device, a wireless phone, a game console, and so forth. Thus, the clients 104(1)-104(N) may range from full resource devices with substantial memory and processor resources (e.g., personal computers, game consoles) to low-resource devices with limited memory and/or processing resources (e.g., traditional set-top boxes, hand-held game consoles). The clients 104(1)-104(N) may also relate to a person and/or entity that operate the clients. In other words, one or more of the clients 104(1)-104(N) may describe logical clients that include users, software, and/or devices.

Additionally, although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be configured to include multiple networks. For instance, client 104(1) may be communicatively coupled via a peer-to-peer network with client 104(N). Each of the clients 104(1), 104(N) may also be communicatively coupled to the content provider 102(*m*) over the Internet. A variety of other instances are also contemplated.

Each of the plurality of clients 104(1)-104(N) is illustrated as including a respective one of a plurality of messaging modules 108(1)-108(N). Each messaging module 108(1)-108(N) is executable such that a respective client 104(1)-104(N) may participate in an instant messaging session with another one of the clients 104(1)-104(N). Instant messaging provides a mechanism such that each of the clients 104(1)-104(N), when participating in an instant messaging session, may send text messages to each other. The instant messages are typically communicated in real time, although delayed delivery may also be utilized, such as by logging the text messages when one of the clients 104(1)-104(N) is unavailable, e.g., offline. Thus, instant messaging may be thought of as a combination of e-mail and Internet chat in that instant messaging supports message exchange and is designed for two-way live chats. Therefore, instant messaging may be utilized for synchronous communication. For instance, like a voice telephone call, an instant messaging session may be performed in real-time such that each client 104(1)-104(N) may respond to each other user as the instant messages are received.

In an implementation, the messaging modules 108(1)-108(N) communicate with each other through use of one or more of a plurality of service providers 110(*s*), where "s" can be any integer from one to "S". Service provider 110(*s*), for instance, may include a messaging manager module 112(*s*) which is executable to route instant messages between the messaging modules 108(1)-108(N). For example, client 104(1) may cause the messaging module 108(1) to form an instant message for communication to client 104(N). The messaging module 108(1) is executed to communicate the instant message to the service provider 110(*s*), which then executes the messaging manager module 112(*s*) to route the instant message to the client 104(N) over the network 106. The client 104(N) receives the instant message and executes the messaging module 108(N) to display the instant message.

In another implementation, when the clients 104(1), 104(N) are communicatively coupled directly, one to another (e.g., via a peer-to-peer network), the instant messages are communicated without utilizing the service provider 110(*s*). Further discussion of the use of a peer-to-peer network by the clients 104(1)-104(N) may be found in relation to FIG. 2.

Each of the plurality of clients 104(1)-104(N) has access to a wide variety of content in the environment 100 of FIG. 1. For example, each of the plurality of content providers 102(*m*) may provide a plurality of content 114(*k*), where "k" can be any integer from one to "K". The content 114(*k*) may be configured in a variety of ways, such as web pages 116, music 118, images 120, and other content 122 such as web logs (blogs). Likewise, each of the clients 104(1)-104(N) may include respective storage 124(1)-124(N) for respective pluralities of content 126(*g*), 128(*h*), where "g" and "h" can be any integer from one to "G" or "H" respectively.

To locate particular content of interest, each of the clients 104(1)-104(N) includes a respective search module 130(1)-130(N) that is executable to locate content in a variety of ways. For example, search module 130(1) may be executed by client 104(1) to locate a particular content item from the plurality of content 126(*g*) stored locally on the client 104(1). In another example, the search module 130(1) is executable to interact with a search manager module 132(*s*) which may be included on one or more of the service providers 110(*s*). For instance, service provider 110(*s*) may execute the search manager module 132(*s*) to provide search engine functionality, such as to respond to search queries and provide search results.

Although the search manager module 132(*s*) is illustrated within the messaging manager module 112(*s*) on the service provider 110(*s*), the modules may be provided separately on different service providers 110(*s*). For example, one of the service providers 110(*s*) may include the messaging manager module 112(*s*) to provide an instant messaging service and another one of the service providers 110(*s*) may include the search manager module 132(*s*) to provide search functionality, e.g., a search engine. A variety of other examples are also contemplated.

The search modules 130(1)-130(N), for example, are illustrated as within the respective messaging modules 108(1)-108(N) to depict that the messaging modules 108(1)-108(N) may incorporate the functionality of the search modules 130(1)-130(N) during an instant messaging session. Although illustrated together, the search modules 130(1)-130(N) and the messaging modules 108(1)-108(N) may be provided separately and communicate via respective, application programming interfaces. Further discussion of the operation of the search modules 130(1)-130(N) in conjunction with the messaging modules 108(1)-108(N) may be found in relation to FIGS. 3-10.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the instant messaging techniques described below are platform-independent, meaning that the instant messaging techniques may be implemented on a variety of commercial computing platforms having a variety of processors.

Figure 2:
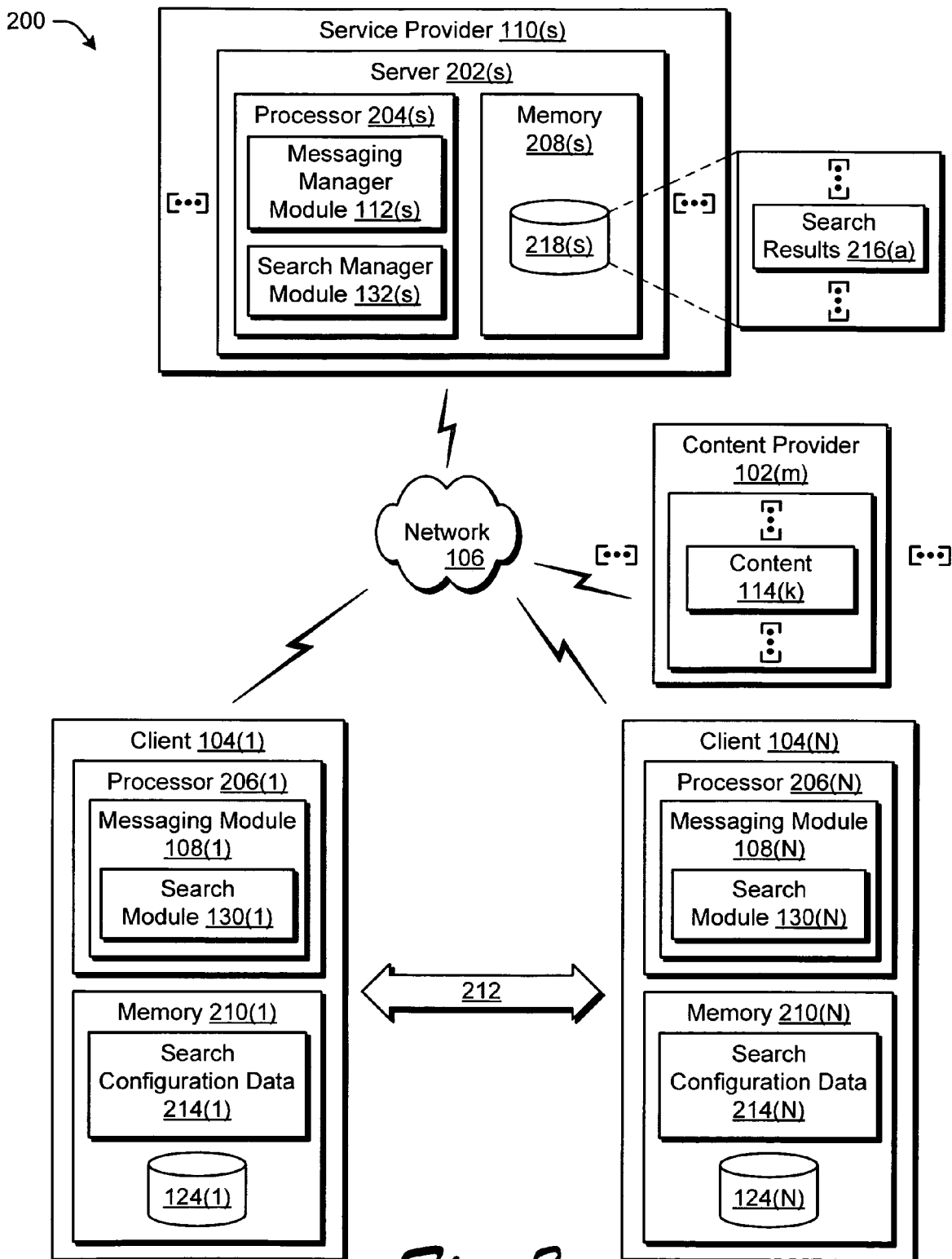
FIG. 2 is an illustration of a system in an exemplary implementation showing a plurality of service providers and a plurality of clients of FIG. 1 in greater detail.

FIG. 2 is an illustration of a system 200 in an exemplary implementation showing the plurality of service providers 110(*s*) and the plurality of clients 104(1)-104(N) of FIG. 1 in greater detail. The plurality of service providers 110(*s*) are illustrated as being implemented by a plurality of servers 202(s). Although a single server 202(s) is illustrated for each service provider 110(s), the service providers 110(s) may be implemented by one or more servers, e.g., a server farm. The plurality of clients 104(1)-104(N) in FIG. 2 are illustrated as client devices. For examples, the plurality of servers and the clients 104(1)-104(N) are illustrated as including a respective processor 204(s), 206(1)-206(N) and respective memory 208(s), 210(1)-210(N).

Processors are not limited by the materials from which they are formed or the processing mechanisms employed therein. For example, processors may be comprised of semiconductor (s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 208(s), 210(1)-210(N) is shown for the respective servers 202(s) and clients 104(1)-104(N), a wide variety of types and combinations of memory may be employed, such as random access memory (RAM), hard disk memory, removable medium memory, and so forth.

Each of the plurality of clients 104(1)-104(N) includes a respective one of a plurality of messaging modules 108(1)-108(N) which is illustrated as being executed on a respective processor 206(1)-206(N) and is storable in a respective memory 210(1)-210(N). As previously stated, the messaging modules 108(1)-108(N) are executable to provide an instant messaging session, either in indirect communication through use of the service provider 110(s) over the network 106 and/or in direct communication over a peer-to-peer network 212, which is illustrated in FIG. 2 by a double-headed arrow to indicate that the peer-to-peer network 212 may be provided separately from the network 106.

The plurality of messaging modules 108(1)-108(N) may be provided to the plurality of clients 104(1)-104(N) in a variety of ways. In an implementation, the messaging modules 108(1)-108(N) are provided by the service provider 110(s) (and more particularly through execution of the messaging manager modules 112(s)) in response to a request to initiate an instant messaging session. For example, client 104(1) may request initiation of an instant messaging session with client 104(N). If client 104(N) accepts initiation of the instant messaging session, the messaging manager module 112(s) is executed on processor 204(s) to communicate the messaging module over the network 106 for execution on the respective clients 104(1)-104(N) to provide an instant messaging session.

As previously described, the search modules 130(1)-130(N) are executable in a variety of ways to provide a search for a particular content item, such as to search local storage 124(1)-124(N) on the clients 104(1)-104(N) and/or for content 114(k) from content providers 102(m) that are accessible remotely over the network 106. For instance, the search modules 130(1)-130(N) may receive search queries as inputs. The search modules 130(1)-103(N) may then construct search uniform resource locators (URLs) from the search query using respective search configuration data 214(1)-214(N). For instance, the user may provide a text input "why did the chicken cross the road" and specify a search for "images". Therefore, the search configuration data 214(1) may be utilized to specify a search URL for images which correspond to the text input. The search URL may then be utilized to access the service provider 110(s) and find one or more of a plurality of search results 216(a) (where "a" can be any integer from one to "A") which are illustrated as stored in storage 218(s) in memory 208(s) of the server 202(s). A variety of techniques may be utilized to perform the search, further discussion of which may be found in relation to the following procedures.

Exemplary Procedures

The following discussion describes instant messaging with search that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and/or the system 200 of FIG. 2.

Figure 3:
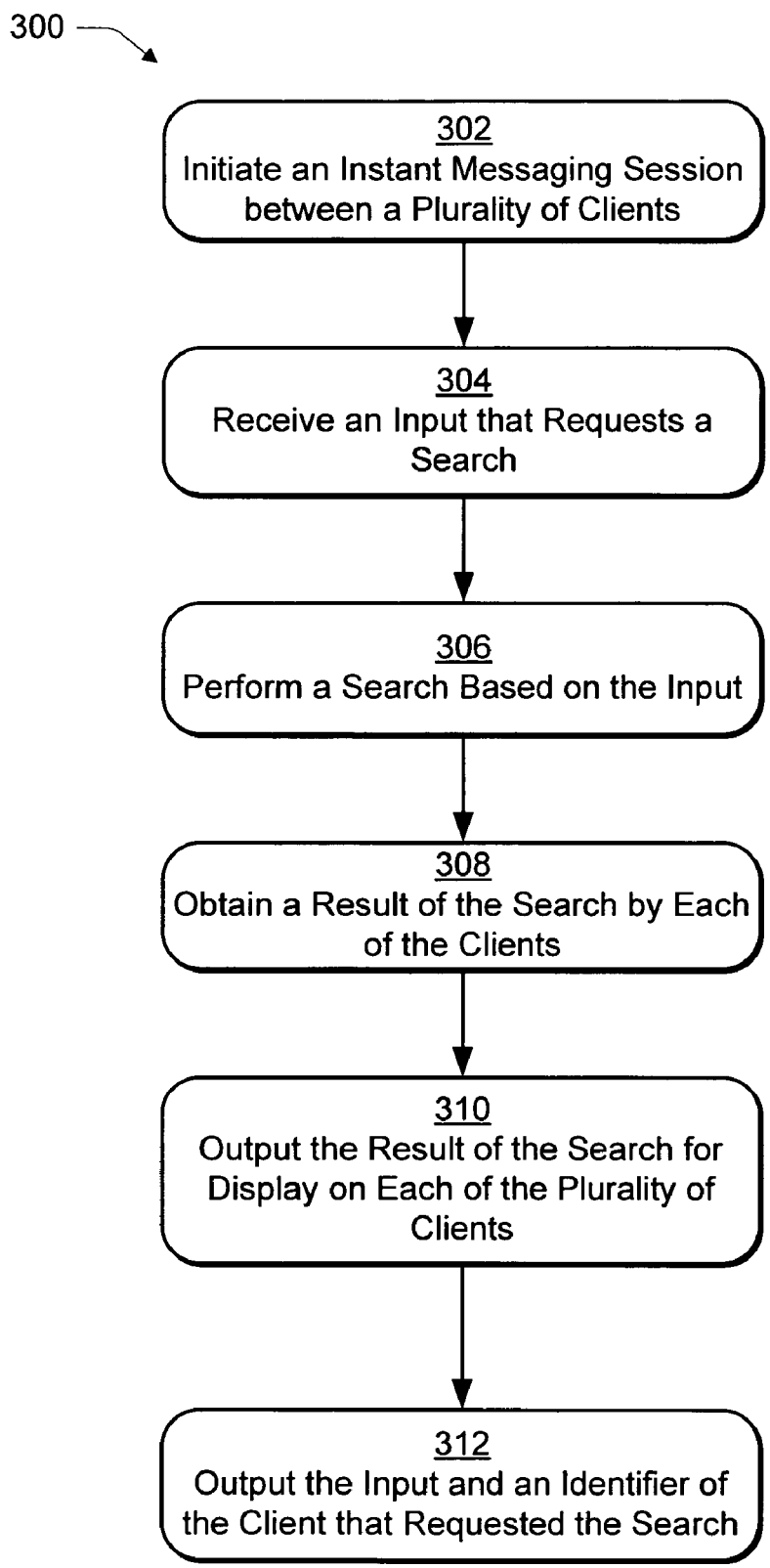
FIG. 3 is a flow diagram depicting a procedure in an exemplary implementation in which a search is performed during an instant messaging session, the results of which are output at each client participating in the instant messaging session.

FIG. 3 is a flow diagram depicting a procedure 300 in an exemplary implementation in which a search is performed during an instant messaging session, the results of which are output at each client participating in the instant messaging session. An instant messaging session is initiated between a plurality of clients (block 302). For example, client 104(1) may execute a messaging module 108(1) to communicate via the instant messaging session with a messaging module 108(N) on client 104(N). This communication may be performed in a variety of ways, such as directly via the peer-to-peer network 212, indirectly via the messaging manager module 112(s) of the service provider 110(s), and so on.

During the instant messaging session, an input is received that requests a search (block 304). For instance, the user interface output by the messaging module 108(1) may include functionality to accept a text input from a user of the client 104(1) and to accept initiation of a search based on the text input. A search is then performed based on the input (block 306). For example, a search may be performed for content 126(g) stored locally on the client 104(1) through execution of the search module 130(1). In another example, a search is performed for content 114(k) available from a content provider 102(m) over the network 106 through interaction with the search manager module 132(s), e.g., when the search manager module 132(s) is configured to operate as a search engine. A variety of other examples are also contemplated.

A result of the search is obtained by each of the clients (block 308), which is then output for display (block 310) by each respective client. In additional, the input and an identifier of the client that requested the search may also be output (block 312). Thus, each of the clients may be informed as to which client initiated the search, the search query that was used to perform the search, and the results of the search.

The search may be performed and the results output utilizing a variety of techniques. For instance, a technique may be utilized in which the search is performed by one of the participating clients, the results of which are then transferred to other participants (e.g., clients) of the instant messaging session. Using this technique, for example, a search query may be input by client 104(1), which is utilized to obtain one or more search results 216(a) from the service provider 110(s). The search results 216(a) are then transferred by the client 104(1) to each other client participating in the instant messaging session, e.g., client 104(N). In an implementation, the search results 216(a) are "pruned" by the client 104(1) before transfer to the other client 104(N), such as by sending the "top three" of the search result. In another implementation, the entire search results 216(a) obtained by the client 104(1) are transferred to the other client, e.g., client 104(N).

In another technique, a search query is sent to each of the clients that participate in the session such that each participant performs the search. For instance, client 104(1) may receive a text input to be used as a search query. The search query is then transferred to each participant in the instant messaging session, such as through use of multipurpose internet mail extensions (MIME) message transport. For example, a MIME message type may be created, e.g., "text/search-query", that is processed by the messaging module 108(N) to cause the search to be performed using the received search query. In an implementation, the search is performed automatically and without user intervention in response to receipt of the message. In another implementation, the client outputs a notification to a user that a search is requested and permits the user of the client to accept or decline performance of the search.

Search results obtained from the separate searches are then provided to the respective clients. Using this technique, it is possible that the search results may vary from client to client, such as when the clients are located in different geographical locations that have different markets. Although two techniques have been described for performing the search and obtaining search results, a variety of other techniques are also contemplated without departing from the spirit and scope thereof.

Figure 4:
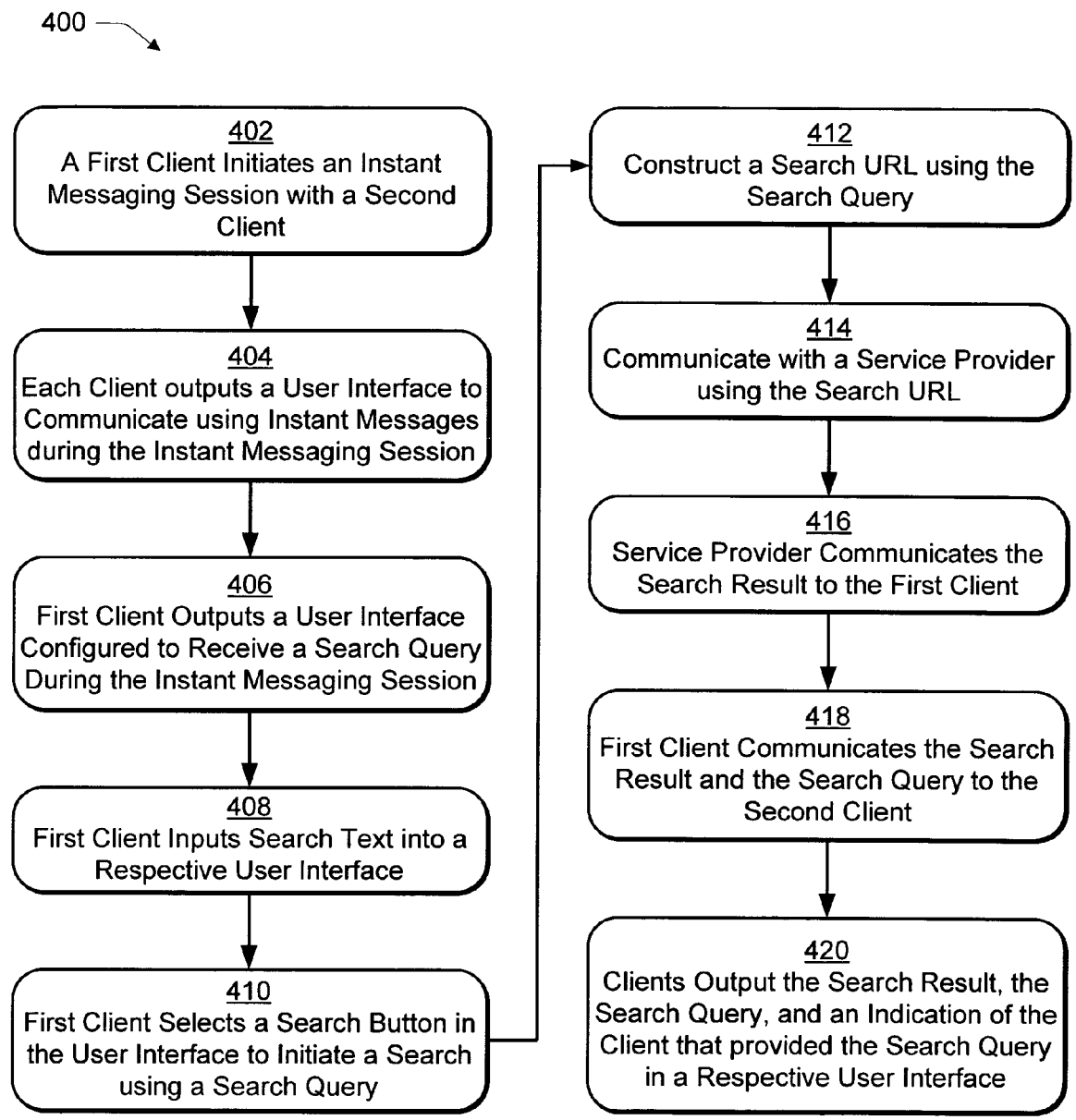
FIG. 4 is a flow diagram depicting a procedure in an exemplary implementation in which a client interacts with an instant messaging user interface to perform a search during an instant messaging session.

FIG. 4 is a flow diagram depicting a procedure 400 in an exemplary implementation in which a client interacts with an instant messaging user interface to perform a search during an instant messaging session. During the discussion of FIG. 4, reference will also be made to the illustrations of FIGS. 5-9.

A first client initiates an instant messaging session with a second client (block 402). Each client then outputs a user interface to communicate using instant messages during the instant messaging session (block 404).

Figure 5:
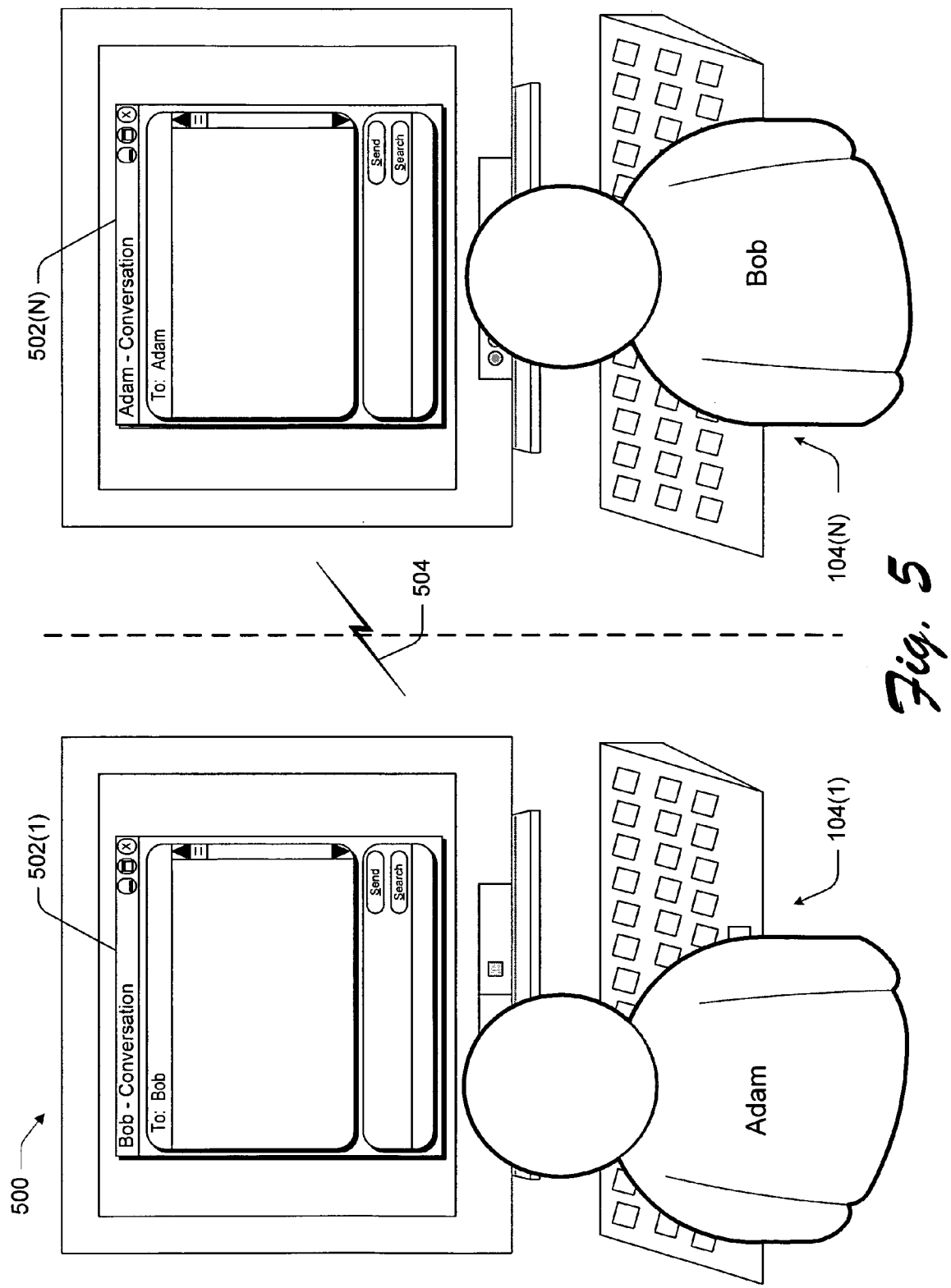
FIG. 5 is an illustration in an exemplary implementation showing user interfaces that are output in relation to an instant messaging session between the plurality of clients of FIG. 2 during an instant messaging session initiated by the procedure of FIG. 4.

FIG. 5 is an illustration 500 in an exemplary implementation showing user interfaces that are output in relation to an instant messaging session between the plurality of clients 104(1)-104(N) of FIG. 2 during an instant messaging session initiated by the procedure 400 of FIG. 4. A first client 104(1) (illustrated as "Adam") and a second client 104(N) (illustrated as "Bob") are engaged in an instant messaging session. Text associated with instant messaging session is rendered for viewing in respective user interfaces 502(1), 502(N) output by the respective clients 104(1), 104(N).

The text messages that are exchanged are transmitted between the clients 104(1), 104(N) via a network connection 504, which may be implemented, for example, over the network 106 of FIG. 1, over the peer-to-peer network connection 212 of FIG. 2, and so on. Although FIG. 5 is illustrated and described in relation to a plurality having two clients 104(1)-104(N) as participating in an instant messaging session, it should be recognized that the techniques described herein may also be applied to scenarios in which three or more users are participating in an instant messaging session.

Reference will now be made again to FIG. 4, in which, a first client outputs a user interface configured to receive a search query during an instant messaging session (block 406). The search query may be input in a variety of ways.

Figure 6:
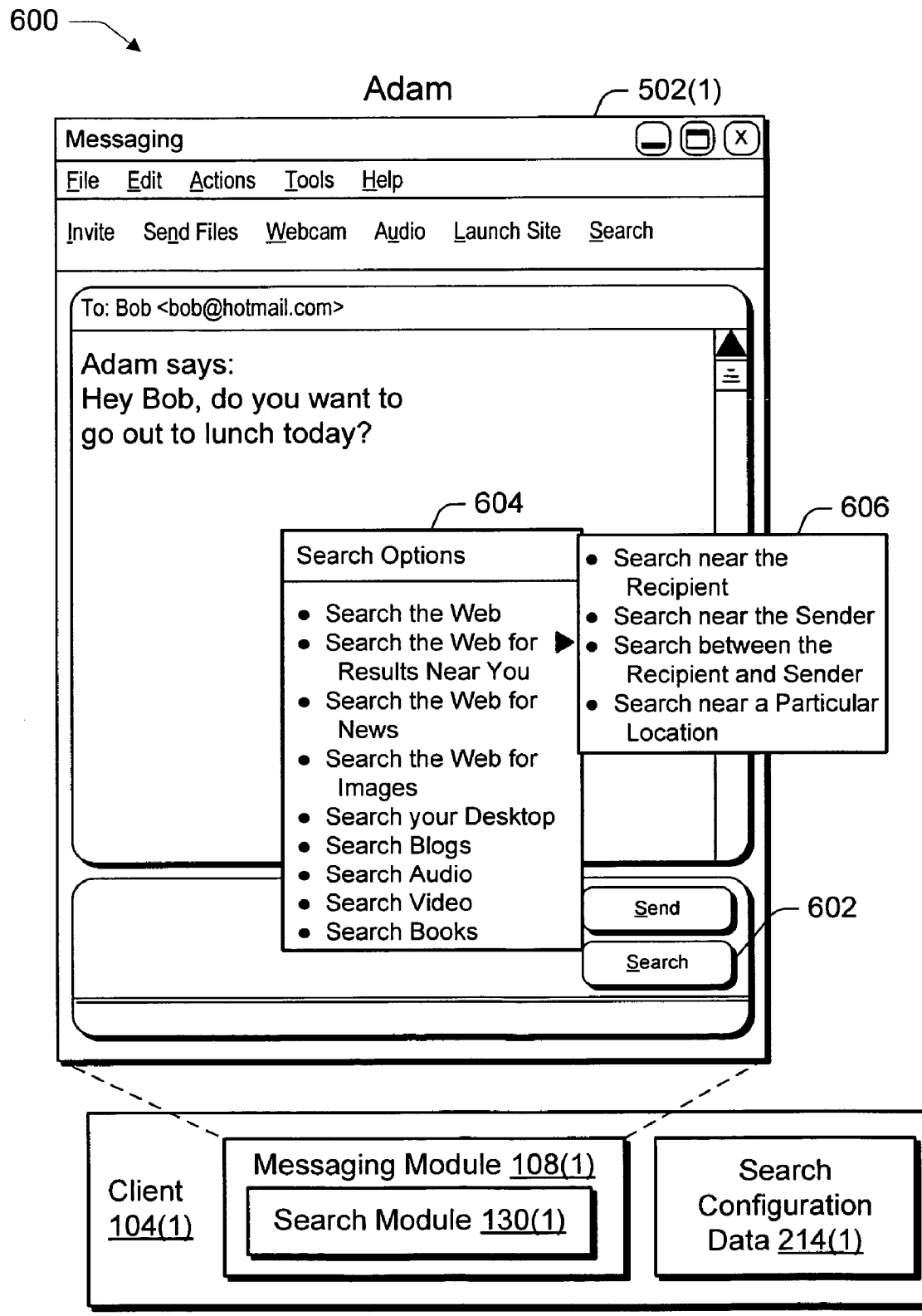
FIG. 6 is an illustration of an exemplary implementation in which a user interface of FIG. 5 is shown has providing a pop-up menu of search options configured to refine a search for a particular content item.

FIG. 6 is an illustration of an exemplary implementation in which the user interface 502(1) of FIG. 5 is shown has providing a pop-up menu of search options configured to refine a search for a particular content item. The client 104(1) is illustrated as executing the messaging module 108(1) to provide the user interface 502(1).

Figure 8:
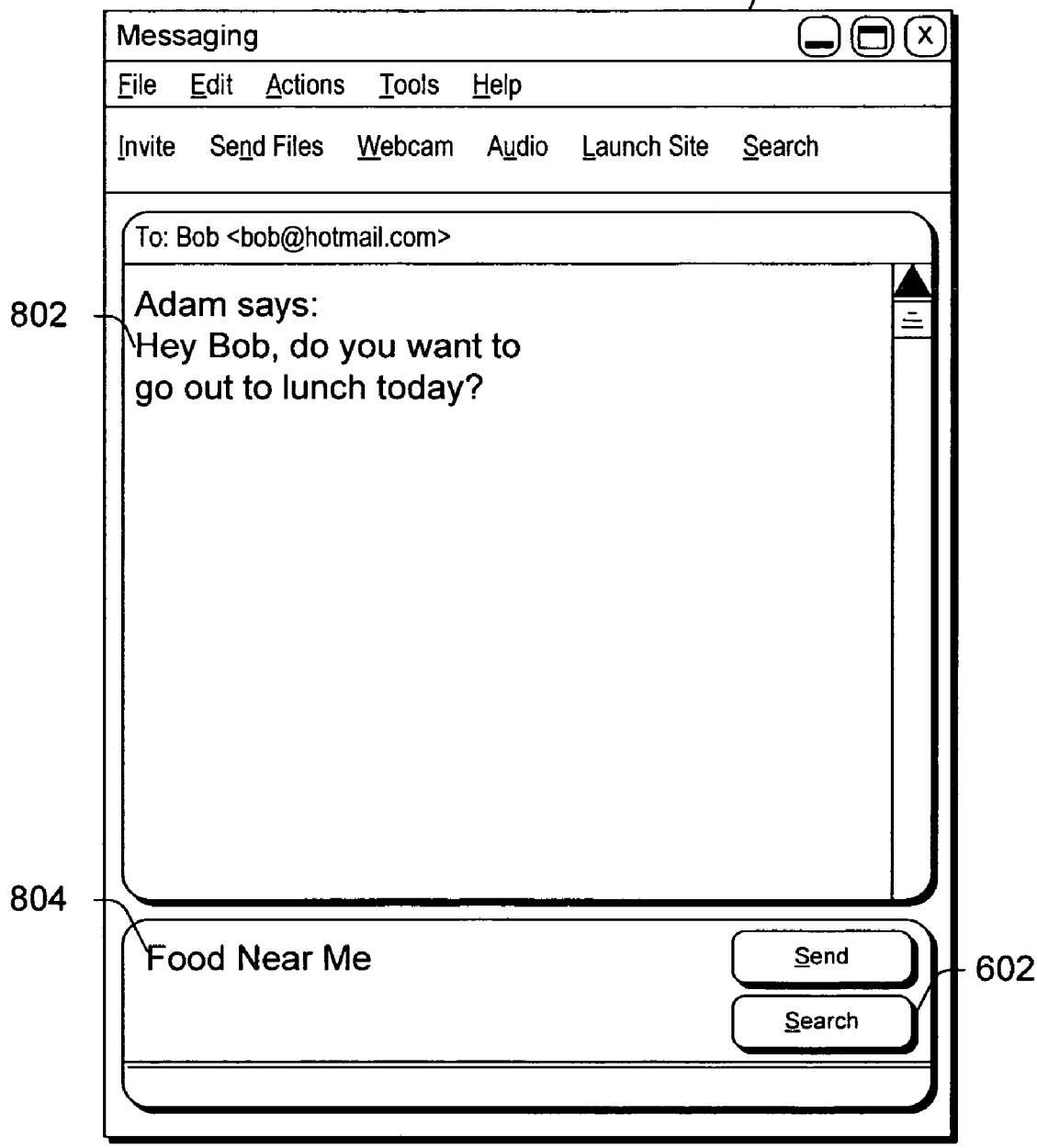
FIG. 8 is an illustration of an exemplary implementation in which a search term is input via the user interface of FIG. 5 and a representation of a search button is selected to cause initiation of a search query.

The user interface 502(1) includes a representation 602 of a search button that is selectable to initiate a search, further discussion of which may be found in relation to FIG. 8. In the embodiment 600 of FIG. 6, a pop-up menu 604 of search options is illustrated as displayed adjacent to the representation 602, i.e., the search button. For instance, the menu 604 may be displayed when "right-clicking" the representation 602 of the search button, by entering a key combination, and so on.

Each of the search options may be utilized to limit a scope of a search, the illustrated options including limiting the scope to the "web", "results near you", "news", "images", "desktop", "blogs", "audio", "video" and "books". For instance, a user may enter a search term for "dog" and specify that the search is to be performed for "images". Therefore, the search module 130(1) may obtain images which correspond to dogs.

The search options displayed in the pop-up menu 604 may also be further refined via a sub-menu 606. For example, the search option "search the web for results near you" may have a variety of sub-options, which are illustrated as "search near the recipient", "search near the sender", "search between the recipient and sender" and "search near a particular location". The "search near the recipient" option may be utilized to search near an originator of the search, and have the results of the search shared by each of the participants in the instant messaging session. Likewise, the "search near the sender" may be utilized to find search results near the sender, while the "search near the recipient and the sender" may be utilized to find search results that address the sender and the recipient (e.g., search results for both the sender and the recipient), the sender or the recipient (e.g., search results that address the sender or the recipient), and so on. The "search near a particular location" option may be utilized to share a search in one location and use information relating to the sender and/or the recipient. A wide variety of other examples are also contemplated.

Although the previous examples describe the sharing of search results with each client that participates in the instant messaging session, the sender may also specify that the search results are sent to particular clients, such that one of the clients does not receive the search results. For example, another menu may be displayed having a representation of each client that participates in the instant messaging session such that the client 104(1) may select which clients are to receive the search results. The specifying of particular clients may be performed in a variety of other ways without departing from the spirit and scope thereof.

The search module 130(1) may examine the search configuration data 214(1) to determine a URL, at which, the search results may be obtained which correspond to the selection, e.g., "search the web for news" and a URL specified as "url:/news/" from the search configuration data 214(1). A variety of other examples are also contemplated, an example of which is shown in the following figure.

Figure 7:
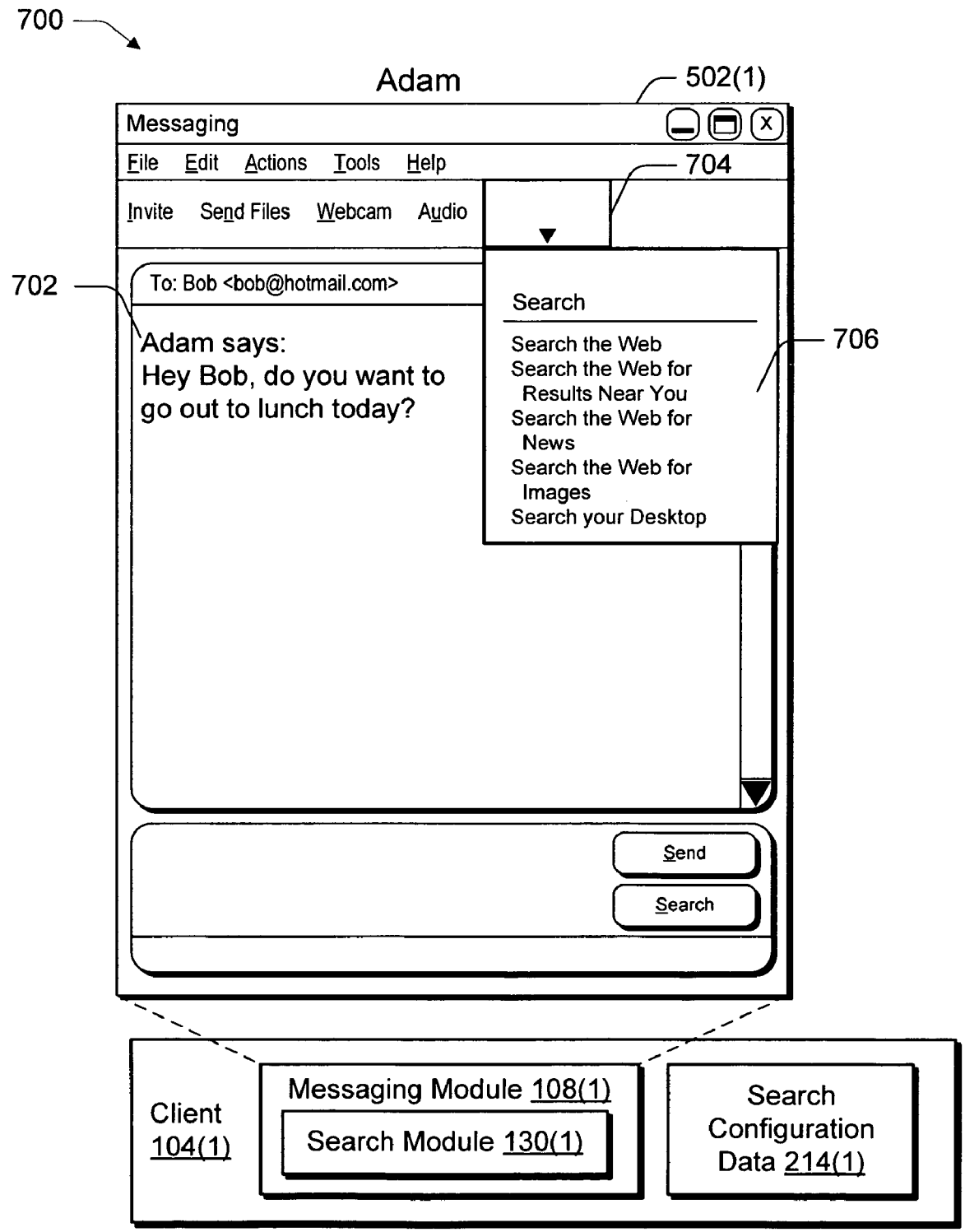
FIG. 7 is an illustration of another exemplary implementation in which the user interface of FIG. 5 is shown has providing a drop-down menu of search options configured to refine a search for a particular content item.

FIG. 7 is an illustration of another exemplary implementation 700 in which the user interface 502(1) of FIG. 5 is shown has providing a drop-down menu of search options configured to refine a search for a particular content item. In the illustrated instant messaging session, the first and second users (i.e., Adam and Bob) have exchanged text messages 702 which are displayed the user interface 502(1). To initiate a search menu, the first client 104(1) (i.e., Adam) selects a search menu item 704, which causes a drop-down menu 706 of available search constraints as previously described. Accordingly, the first client 104(1) may select one or more of the search constraints to limit a scope of the search from the drop-down menu 706.

As shown in FIG. 4, a first client (e.g., client 104(1)) inputs a search query into a respective user interface (block 408). The first client then selects a search button in the user interface to initiate a search using the search query (block 410).

FIG. 8 is an illustration of an exemplary implementation 800 in which a search query is input via the user interface 502(1) of FIG. 5 and a representation of a search button selected to cause initiation of the search query. The user interface 502(1) includes an output of an instant message 802 which includes the text "Hey bob, do you want to go out to lunch today". To find a location to have lunch, a search query 804 is entered including the text "food near me". The representation 602 of the search button may then be selected to initiate a search using the search query.

Reference will now be made again to FIG. 4, a search URL is constructed using the search query (block 412), which is then utilized to communicate with a service provider (block 414). For example, when the search button (e.g., representation 602) is selected in the user interface 502(1), a search URL is constructed from the search query which is then utilized to access the service provider 110(s) to obtain a corresponding search result. In this implementation, the service provider communicates the search result to the first client (block 416), which then communicates the search result and the search query to second client (block 418). The clients (e.g., 104(1), 104(N)) then output the search results, the search query, and an indication of the client (e.g., Adam) that provided the search query in a respective user interface (block 420), an example of which may be found in relation to the following figure.

FIG. 9 is an illustration in an exemplary implementation 900 showing the user interfaces 502(1), 502(N) as outputting search results and a search query utilized to obtain the search results as being shared by participants in an instant messaging session. Each of the user interfaces 502(1), 502(N) includes the instant message 802 communicated between the clients 104(1), 104(N) and an output of the search query 804 as input in FIG. 8 for use in the search.

The user interfaces 502(1), 502(N) also include an indication 902 of the client that initiated the search, which in the illustrated example is "Adam". A plurality of search results 904(1), 904(2), 904(3) is also illustrated in the user interfaces 502(1), 502(N). Thus, Bob (i.e., client 104(N)) is informed that a search was performed, what search query was used in the search, who performed the search, and results of the search through selection of the search button 602.

A "more results" 906 indication is also displayed in each of the user interfaces 502(1), 502(N), which may be utilized to obtain additional search results. For example, as previously described the client 104(1) (i.e., Adam), before communicating the search results to client 104(N) (i.e., Bob) may "prune" the results, such as to conserve network bandwidth and conserve resources. Therefore, to obtain these additional results, Bob may select the "more results" 906 indication to cause communication of these additional results from Adam, i.e., client 104(1). In another example, the entirety of the search results are communicated without "pruning", and therefore the "more results" 906 indication may be utilized to obtain additional results that are not currently displayed but that are already available on the client 104(N). A variety of other examples are also contemplated.

The user interfaces 502(1), 502(N) are further illustrated as including sponsored links 908. The sponsored links 908 may be provided for a fee by the service provider 110(s) to advertisers to gain an additional source of revenue, as well as provide additional search results to the clients 104(1), 104(N). Further discussion of the sponsored links may be found in relation to FIG. 10.

Although the implementations referenced in relation to FIGS. 4-9 were described such that the search result was output by each client that participates in the instant messaging session, the client that initiates the search may also specify particular clients for output of the search result. For instance, upon input of a search term, the user may also specify a particular client that is to output the search result from the search term, such as by specifying a particular client alias, a network address of the client, and so forth. Therefore, the search result may be output by a particular collection of clients that participates in the instant messaging session. For instance, one or more of the clients that participate in the instant messaging session may be excluded from output of the search result.

Figure 10:
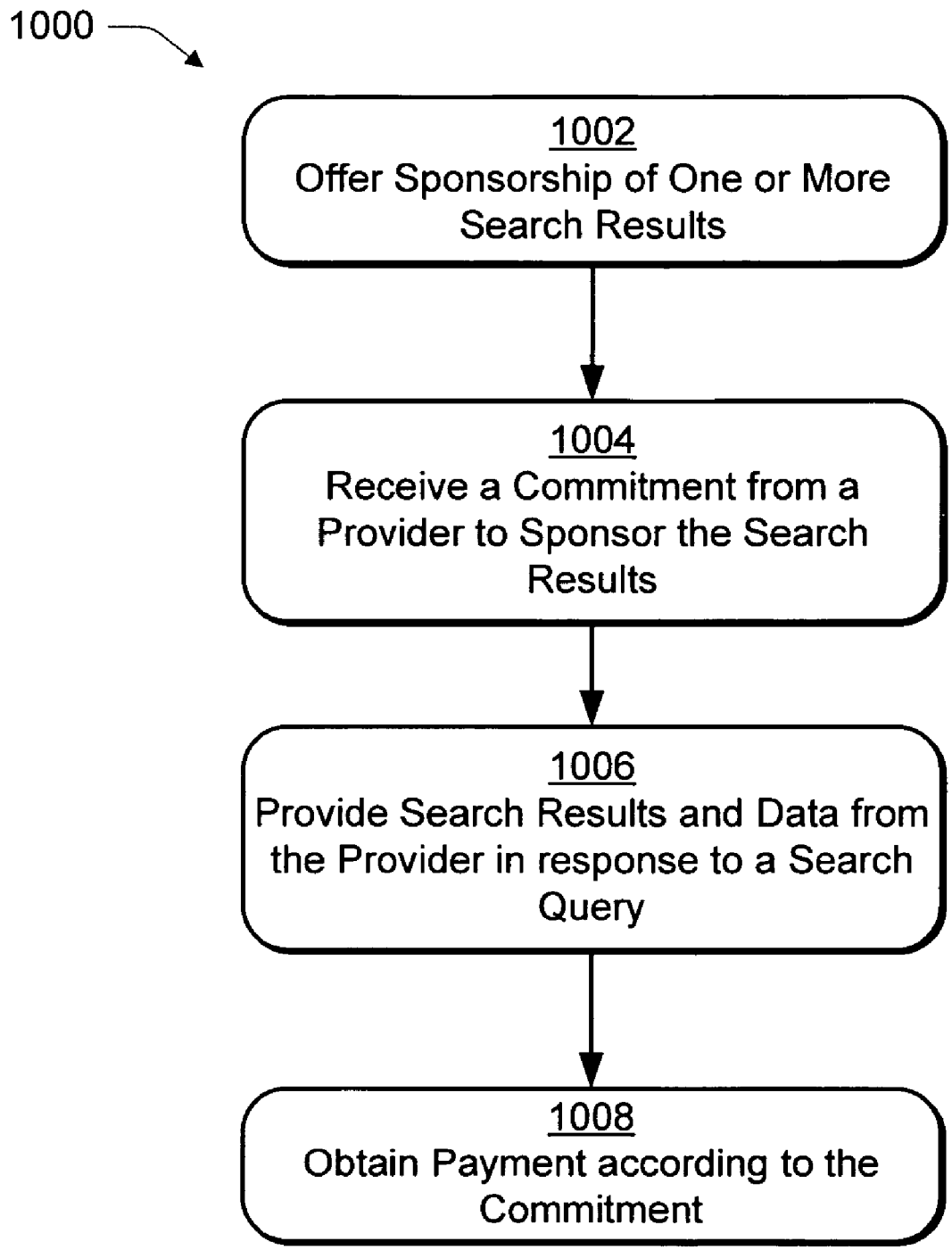
FIG. 10 is a flow diagram depicting a procedure in an exemplary implementation in which a sponsored link is provided by the service provider of FIG. 1 in conjunction with a search result as illustrated in FIG. 9.

FIG. 10 is a flow diagram depicting a procedure 1000 in an exemplary implementation in which a sponsored link is provided by a service provider in conjunction with a search result. A service provider offers sponsorship of search results (block 1002). For example, the service provider may provide an advertisement via a web site that sponsorship of a link is available, either for the particular link and/or is generally available for a variety of links. A variety of other examples are also contemplated.

A commitment is received from a provider to sponsor the search results (block 1004). For instance, the provider may be a content provider that enters into a commitment with the service provider to pay a fee for each client that accesses the provider's web site using a sponsored link. In another instance, the provider may be an advertiser that pays a flat fee for a specified period of time to have an advertisement displayed with search results. A variety of other instances are also contemplated.

Search results are provided which include data from the provider in response to a search query (block 1006). The data, for instance, may include the advertisement and/or sponsored link which is provided to the clients 104(1)-104(N) along with the search results 216(a).

Payment is obtained according to the commitment (block 1008). The search manager module 132(s), for instance, may automatically tally each time search results having a sponsored link are provided and charge a fee for each such time. For example, in the implementations described in relation to FIGS. 4-9, the service provider 10(s) may charge a fee for providing the search results to both client 104(1), 104(N), such as by noting that the search result was provided to client 104(1) and that client 104(1) transferred the search result to client 104(N) the messaging module 108(1). Thus, the service provider 110(s) may monetize provision of the search results to the plurality of clients 104(1)-104(N), even when the clients transfer the results.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method implemented by a first computing device of a plurality of computing devices, wherein each computing device of the plurality of computing devices comprises a processor and memory, the method comprising:

receiving, by the first client of a plurality of clients that participate in an instant messaging session, a search query from a second client of the plurality of clients that participate in the instant messaging session;

upon receipt of the search query, displaying of a notification to a user of the first client, the notification indicating that the search query has been requested and permitting the user to accept or decline execution of a search;

presenting search options via a pop-up menu that is displayed in response to a right-click input, wherein the search options comprise:
  (i) searching near a location of at least one of a plurality of clients that participate in the instant messaging session;
  (ii) searching near another client location that participates in the instant messaging session;
  (iii) searching between the a location of at least one of the plurality of the clients that participate in the instant messaging session and another client location that participates in the instant messaging session; and
  (iv) searching near a particular location that is specified by the at least one of the plurality of clients that participate in the instant messaging session or another client that participates in the instant messaging session;

if the user of the first client permits execution of the search, executing the search using the search query and a selected search option;

receiving a search result for output by at least one of the plurality of clients during the instant messaging session.

2. A method as described in claim 1, wherein the search query is input via a user interface that is also configured to display instant messages during the instant messaging session.

3. A method as described in claim 1, wherein the output resulting from the providing includes an indication of one said client that provided the search query and the search query for concurrent display with the search result in a user interface.

4. A method as described in claim 1, wherein the output resulting from the providing includes a sponsored link.

5. A method as described in claim 1, wherein the search result references at least one content item stored locally by at least one said client.

6. A method as described in claim 1, wherein the clients are communicatively coupled, one to another, via a peer-to-peer network.

7. A method as described in claim 1, further comprising providing sponsorship of the search result.

8. One or more computer-readable storage media comprising computer executable instructions that, when executed, direct a first client of a plurality of clients that participate in an instant messaging session to perform the following acts upon receipt of a search query from a second client of the plurality of clients:
  display of a notification to a user of the first client, the notification indicating that the search query has been requested and permitting the user to accept or decline execution of a search, wherein the plurality of clients each comprise a processor and memory;
  presenting search options via a pop-up menu that is displayed in response to a right-click input, wherein the search options comprise:
    (i) searching near a location of an originator of the search;
    (ii) searching near a location of at least one of the plurality of the clients that participate in the instant messaging session other than an originator of the search;
    (iii) searching between a location of an originator of the search and the at least one of the plurality of the clients that participate in the instant messaging session other than the originator of the search; and
    (iv) searching near a particular location that is specified by the at least one of the plurality of clients that participate in the instant messaging session;
  if the user of the first client permits execution of the search, executing the search using the search query and a selected search option; and
  receive a search result for output in a user interface by a plurality of clients involved in the instant messaging session.

9. One or more computer-readable media as described in claim 8, wherein the search result is configured to be transferred by one said client to another said client.

10. One or more computer-readable media as described in claim 8, wherein the search result is configured for output over a network by a service provider to each said client.

11. One or more computer-readable media as described in claim 8, wherein the search result includes a sponsored link.

12. One or more computer-readable media as described in claim 8, wherein the user interface is configured to display instant messages communicated by the plurality of clients.

13. One or more computer-readable media as described in claim 8, wherein the search result is configured for output concurrently with an indication of which said client initiated the search and a search query utilized to perform the search.

* * * * *

UNITED STATES PATENT AND TRADEMARK OFFICE
CERTIFICATE OF CORRECTION

PATENT NO. : 7,590,699 B2
APPLICATION NO. : 11/159650
DATED : September 15, 2009
INVENTOR(S) : Aarthi Natarajan et al.

It is certified that error appears in the above-identified patent and that said Letters Patent is hereby corrected as shown below:

In column 10, line 44, after "(N)" insert -- using --.

In column 11, line 11, in Claim 1, after "between" delete "the".

Signed and Sealed this
Eighth Day of February, 2011

David J. Kappos
*Director of the United States Patent and Trademark Office*